US012607332B2

(12) United States Patent
Petschke et al.

(10) Patent No.: US 12,607,332 B2
(45) Date of Patent: Apr. 21, 2026

(54) CLIP-ON LIGHT ASSEMBLY

(71) Applicants: Brian Petschke, Apache Junction, AZ (US); Zakary King, Westland, MI (US)

(72) Inventors: Brian Petschke, Apache Junction, AZ (US); Zakary King, Westland, MI (US)

( * ) Notice: Subject to any disclaimer, the term of this patent is extended or adjusted under 35 U.S.C. 154(b) by 0 days.

(21) Appl. No.: 18/818,002

(22) Filed: Aug. 28, 2024

(65) Prior Publication Data

US 2026/0063282 A1 Mar. 5, 2026

(51) Int. Cl.
*F21V 21/088* (2006.01)
*F21V 23/04* (2006.01)

(52) U.S. Cl.
CPC ............ *F21V 21/088* (2013.01); *F21V 23/04* (2013.01)

(58) Field of Classification Search
CPC . F21V 21/088; F21V 21/0885; F21V 33/0084
USPC .................................................. 362/119, 102
See application file for complete search history.

(56) References Cited

U.S. PATENT DOCUMENTS 1,168,288 A * 1/1916 Davidson ................ B26B 19/46 362/115
1,223,305 A * 4/1917 Allport ................... B26B 19/46 362/396
1,287,393 A * 12/1918 Molnar ................ A43B 1/0036 224/217
2,588,288 A * 3/1952 Pohanka ................ A61C 1/088 439/575
3,919,541 A * 11/1975 Chao ....................... B25B 23/18 362/120
4,480,295 A * 10/1984 Shuster ................... B25B 23/18 362/120
4,837,666 A * 6/1989 Conkle .................... A45B 1/00 135/65
5,211,468 A * 5/1993 Jeng ........................ B25B 23/18 362/120
5,274,943 A * 1/1994 Ratcliffe .............. A01K 97/125 43/17
5,299,104 A * 3/1994 Parmentier ............. B26B 21/46 362/558
5,303,133 A * 4/1994 Wagner ............... F21V 21/0965 362/206
5,448,459 A * 9/1995 Rogers .................. F21V 21/145 362/120
5,469,343 A * 11/1995 Speck ...................... A45B 3/04 362/396
5,785,408 A * 7/1998 Tseng .................. F21V 21/0885 362/120
5,943,809 A * 8/1999 Ring .................... A01K 97/125 43/25
6,428,180 B1 * 8/2002 Karram ................ A61B 5/0059 362/120
6,932,186 B2 * 8/2005 Costa ....................... A61B 7/02 362/396

(Continued)

*Primary Examiner* — Ismael Negron
(74) *Attorney, Agent, or Firm* — The Iwashko Law Firm, PLLC; Lev Ivan Gabriel Iwashko

(57) ABSTRACT

A clip-on light assembly to clip onto a tool, the clip-on light assembly including a clip main body to clip onto the tool, and a light main body attached to the clip main body, the light main body including a light disposed at a front end portion of the light main body, and a power button disposed on the light main body to power-on the light such that a beam of light is emitted from the light.

2 Claims, 2 Drawing Sheets

(56) References Cited

U.S. PATENT DOCUMENTS

| | | | | |
|---|---|---|---|---|
| 7,108,395 | B2 * | 9/2006 | Correa | B25B 9/02 362/190 |
| 7,163,309 | B2 * | 1/2007 | Sohn | A42B 1/244 362/396 |
| 7,393,114 | B2 * | 7/2008 | Devlin | A61B 90/30 362/120 |
| 7,427,149 | B2 * | 9/2008 | Sohn | F21V 21/084 362/396 |
| 8,240,893 | B2 * | 8/2012 | Lin | F21L 4/04 362/120 |
| 9,651,228 | B2 * | 5/2017 | Wang | B43K 29/10 |
| 9,739,466 | B1 * | 8/2017 | Muiruri | F21V 19/0045 |
| 9,914,202 | B2 * | 3/2018 | Portaro | B25B 15/02 |
| 10,383,698 | B2 * | 8/2019 | Julian | A61B 18/1402 |
| 10,837,629 | B1 * | 11/2020 | Rodriguez | F21V 33/0084 |
| 11,253,335 | B2 * | 2/2022 | Pathy | F21V 21/0808 |
| 2002/0105797 | A1 * | 8/2002 | Navid | F21V 33/0084 362/120 |
| 2002/0159253 | A1 * | 10/2002 | Dalebout | F21V 21/0885 362/396 |
| 2015/0049467 | A1 * | 2/2015 | Thompson | B25B 15/02 362/120 |

* cited by examiner

CLIP-ON LIGHT ASSEMBLY

BACKGROUND

1. Field

The present general inventive concept relates generally to a light assembly, and particularly, to a clip-on light assembly.

2. Description of the Related Art

Working in dimly lit or dark environments can be challenging, especially when trying to perform intricate tasks or repairs.

Professionals in varying industries, such as mechanics, plumbers, etc. often cannot rely on traditional work lights as they are bulky, cumbersome, and limited in their versatility.

Therefore, there is a need for a light assembly that can be attached to various tools to conveniently illuminate a worker's work area.

SUMMARY

The present general inventive concept provides a clip-on light assembly.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a lip-on light assembly to clip onto a tool, the clip-on light assembly including a clip main body to clip onto the tool, and a light main body attached to the clip main body, the light main body including a light disposed at a front end portion of the light main body, and a power button disposed on the light main body to power-on the light such that a beam of light is emitted from the light.

The clip main body may include a first deformable clip portion to deform outwardly in a first direction to facilitate the clip main body attaching to the tool, a second first deformable clip portion connected to the first deformable clip portion to deform outwardly in a second direction to facilitate the clip main body attaching to the tool, and a tool receiving space disposed between the first deformable clip portion and the second deformable clip portion to receive a portion of the tool therein.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Tool 10
Clip-On Light Assembly 100
Clip Main Body 110
First Deformable Clip Portion 111
Second Deformable Clip Portion 112
Tool Receiving Space 113
Light Main Body 120
Power Button 121
Light 122
Battery Compartment 123
Charging Port 124
Battery 125

Figure 1:
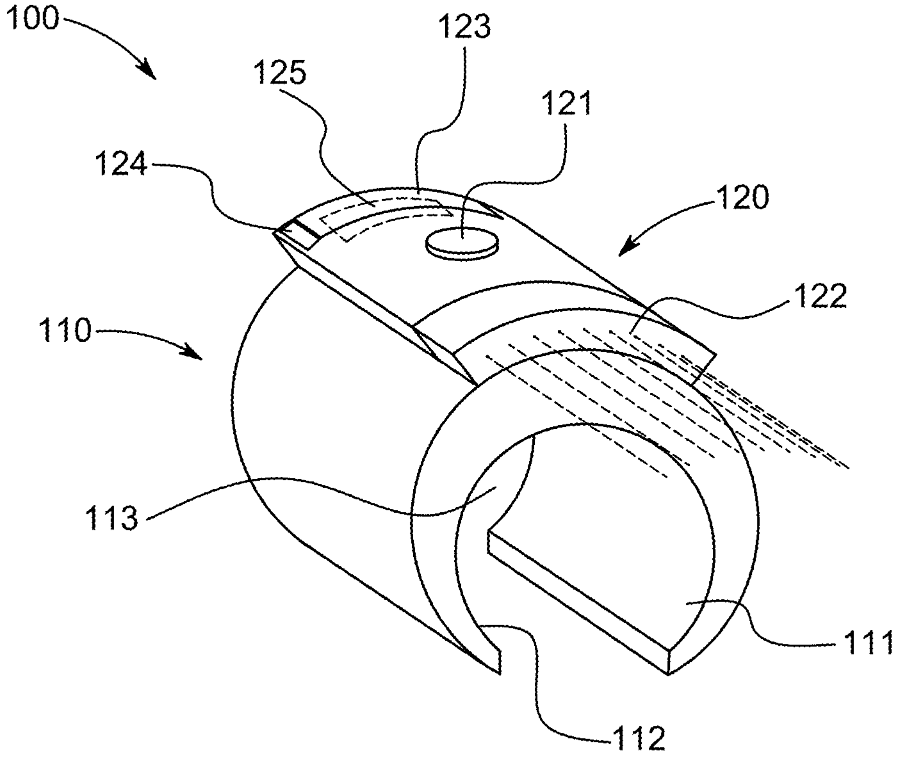
FIG. 1 illustrates a front angled perspective view of a clip-on light assembly, according to an exemplary embodiment of the present general inventive concept.

FIG. 1 illustrates a front angled perspective view of a clip-on light assembly 100, according to an exemplary embodiment of the present general inventive concept.

Figure 2:
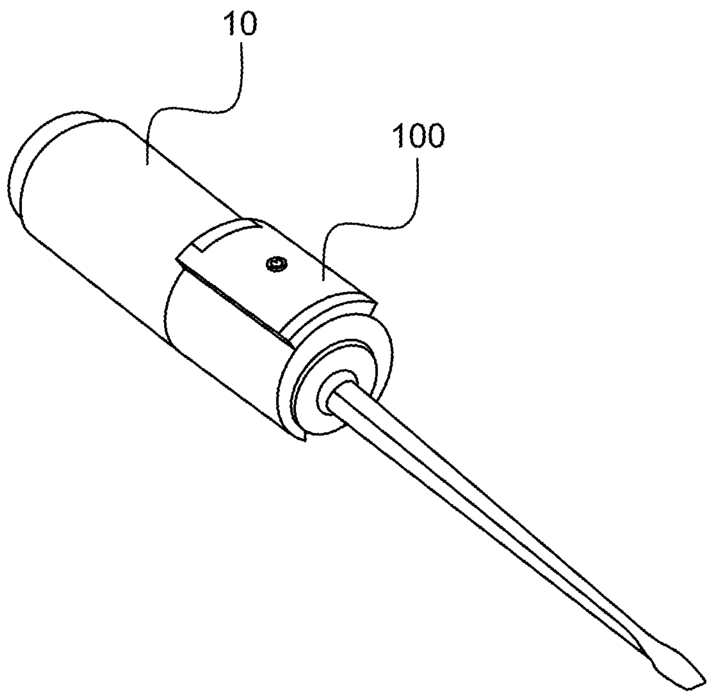
FIG. 2 illustrates a front angled perspective view of the clip-on light assembly of FIG. 1 attached to a tool, according to an exemplary embodiment of the present general inventive concept.

FIG. 2 illustrates a front angled perspective view of the clip-on light assembly 100 of FIG. 1 attached to a tool 10, according to an exemplary embodiment of the present general inventive concept.

The clip-on light assembly 100, and all components therein and/or connected thereto, may be constructed from at least one of metal, plastic, stone, glass, ceramics, wood, silicone, paper, cloth, circuitry, leather, latex, and rubber, etc., but is not limited thereto, and can be constructed from any material known to one of ordinary skill in the art.

Referring to FIG. 1, the clip-on light assembly 100 may include a clip main body 110 and a light main body 120, but is not limited thereto.

The clip main body 110 may be attached at a top surface thereof to a bottom surface of the light main body 120. In other words, the light main body 120 may be above the clip main body 110, but is not limited thereto.

The clip main body 110 may include a first deformable clip portion 111, a second deformable clip portion 112, and a tool receiving space 113, but is not limited thereto.

Referring to FIGS. 1 and 2, the clip main body 110 may be designed to be attachable to a tool 10.

Specifically, the first deformable clip portion 111 and the second deformable clip portion 112 may deform in an outward direction, such that a portion of the tool 10 may be received in the tool receiving space 113, which is disposed between the first deformable clip portion 111 and the second deformable clip portion 112.

Referring to FIG. 2, the tool 10 is depicted as a screwdriver, but the clip-on light assembly 100 is not limited to being able to attach to a screwdriver, and may attach to any type of tool having a substantially tubular shape.

Also, the clip-on light assembly 100 may vary in size, thereby allowing for more diverse attachment possibilities for different types of tools.

The light main body 120 may include a power button 121, a light 122, a battery compartment 123, a charging port 124, and a battery 125, but is not limited thereto.

The power button 121 may be disposed on the light main body 120 and electrically connected to the light 122, such that depression of the power button 121 may power-on and/or power-off the light 122.

The light 122 may be any type of light known to one of ordinary skill in the art, including, but not limited to, light emitting diodes (LEDs), a halogen light, an incandescent light, a laser, etc.

The battery compartment 123 may be disposed on a surface of the light main body 120 to allow a user to access the battery 125, which may be removeable from the battery compartment 123.

The battery 125 may be rechargeable via the charging port 124, which may be any type of charging port, including, but not limited to, a USB port, a mini USB port, a micro USB port, a USB-C port, and a lightning port.

The battery 125 may provide power to the light 122, such that the light 122 is able to be powered-on when the power button 121 is pressed.

Therefore, a user may clip the clip-on light assembly 100 onto the tool 10 by deforming the first deformable clip portion 111 and the second deformable clip portion 112 such that a portion of the tool 10 may be received within the tool receiving space 113, and then the user may power on the light 122 by pressing the power button 121, thus illuminating the work space around the user.

A clip-on light assembly 100 to clip onto a tool 10, the clip-on light assembly 100 including a clip main body 110 to clip onto the tool 10, and a light main body 120 attached to the clip main body 110, the light main body 120 including a light 122 disposed at a front end portion of the light main body 110, and a power button 121 disposed on the light main body 120 to power-on the light 122 such that a beam of light is emitted from the light 122.

The clip main body 110 may include a first deformable clip portion 111 to deform outwardly in a first direction to facilitate the clip main body 110 attaching to the tool 10, a second first deformable clip portion 112 connected to the first deformable clip portion 111 to deform outwardly in a second direction to facilitate the clip main body 110 attaching to the tool 10, and a tool receiving space 113 disposed between the first deformable clip portion 111 and the second deformable clip portion 112 to receive a portion of the tool 10 therein.

A main purpose of the present general inventive concept is to provide users with a clip-on light accessory that works with any tool to instantly brighten up a workspace. Ingenious and practical, the present general inventive concept offers a compact modern accessory that conveniently attaches to any tool to provide powerful illumination directly at the point of a work surface ensuring users have clear visibility during different operations. Expanding on the initial design of any tool, regardless of size or shape, the present general inventive concept introduces a novel clip-on ring that attaches securely to the wand of a specific tool without requiring the need for additional hardware. The durable clip ensures a secure fit allowing users to focus on their work without worrying about the light shifting or falling off during utilization. The present general inventive concept is equipped with high-quality LED bulbs to deliver a bright light able to illuminate dark or tight work areas, an asset in various work scenarios. With its versatile clip-on design, powerful illumination, and weatherproof construction, this lighting accessory serves to make every job easier and more efficient. As a result, the present general inventive concept may prove to be essential in the hardware/novelty industry.

The present general inventive concept is the only product of its kind that can be easily and quickly attached to all tools regardless of size and shape from wrenches and screwdrivers to power drills and saws. This unprecedented product is uniquely designed with durable, high-quality materials and is completely weatherproof to ensure reliable performance under varying external conditions.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A clip-on light assembly to clip onto a tool, the clip-on light assembly comprising:

a clip main body to clip onto the tool, the clip main body having a curved top surface; and a light main body attached to the clip main body, wherein the clip main body has a curved bottom surface and a curved top surface such that an entirety of the curved top surface of the light main body is parallel to the curved bottom surface of the light main body, such that the light main body does not exceed a length of the clip main body and has a length that is exactly the length of the clip main body such that the light main body is entirely disposed on and directly in contact with the clip main body, and such that an entirety of the curved bottom surface of the light main body is in direct contact with and parallel to the curved top surface of the clip main body, the light main body comprising:

a light disposed at a front end portion of the light main body, wherein a front surface of the light is in line with and flush with respect to a front surface of the clip main body, and a rear surface of the light main body is in line with and flush with respect to a rear surface of the clip main body, and a power button disposed on the light main body to power-on the light such that a beam of light is emitted from the light.

2. The clip-on light assembly of claim 1, wherein the clip main body comprises:

a first deformable clip portion to deform outwardly in a first direction to facilitate the clip main body attaching to the tool;

a second first deformable clip portion connected to the first deformable clip portion to deform outwardly in a second direction to facilitate the clip main body attaching to the tool; and a tool receiving space disposed between the first deformable clip portion and the second deformable clip portion to receive a portion of the tool therein.

* * * * *